ated Jan. 30, 1962

3,019,240
6α-CYANO PROGESTERONE AND DERIVATIVES THEREOF
Albert Bowers and Howard J. Ringold, Mexico City, Mexico, assignors to Syntex, S.A., Mexico City, Mexico, a corporation of Mexico
No Drawing. Filed Nov. 5, 1959, Ser. No. 850,995
Claims priority, application Mexico Nov. 6, 1958
27 Claims. (Cl. 260—397.3)

This invention relates to certain new cyclopentanoperhydrophenanthrene derivatives.

More particularly, our invention relates to the novel 6-cyano derivatives of the pregnane series, and more specifically those of progesterone and 17α-hydroxyprogesterone, and the derivatives thereof having an oxygen function being either keto or β-hydroxyl, at C-11, optionally in conjunction with a fluorine atom at C-9; furthermore, their 1-dehydro-, 6-dehydro- and 1,6-bis-dehydro-derivatives, as well as the 17-esters of all of the aforesaid compounds. These compounds are represented by the following general formulas:

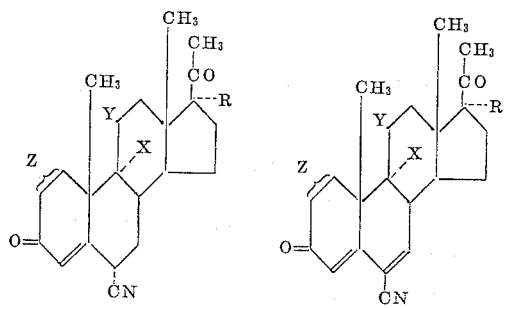

in which Y is selected from the group consisting of

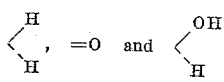

X is a member of the group consisting of hydrogen and fluorine and is hydrogen where Y is hydrogen, and fluorine where

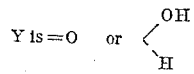

Z is a carbon-to-carbon linkage selected from the group consisting of C—C and C=C, and R is a member of the group consisting of hydrogen, hydroxy, and the acyloxy radical of a hydrocarbon carboxylic acid having up to about 12 carbon atoms; the hydrocarbon carboxylic acid can be saturated or unsaturated, of straight, branched, cyclic or mixed aliphatic-cyclic chain, which may have functional substituents such as hydroxyl, acyloxy (of 1 to 12 C), alkoxy (1 to 5 C) or halogen; typical esters derived from such acids are the acetate, propionate, isobutyrate, hemisuccinate, enanthate, caproate, benzoate, trimethylacetate, phenoxyacetate, phenylpropionate and β-chloropropionate.

Our invention also comprises the novel 6-cyano derivatives of 19-nor-progesterone and 17α-hydroxy-19-nor-progesterone, represented by the general formulas:

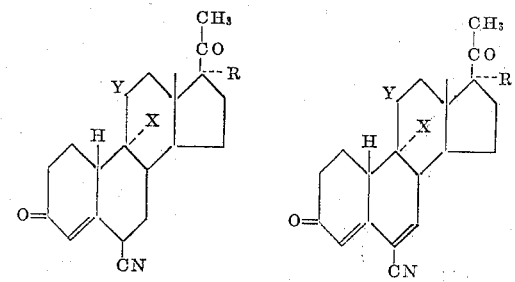

wherein R, X and Y have the same meaning as set forth above.

The new compounds being the object of the present invention and particularly those which have no substituent at C-11 are potent progestational agents of anti-androgenic and anti-estrogenic activity; the 11-substituted compounds of the 10-methyl series are in addition useful intermediates in the synthesis of 6-cyano cortical hormones which are anti-inflammatory agents and may readily be prepared from the former compounds by conventional introduction of the 21-hydroxy group.

The process for making the new compounds according to the invention essentially involves the introduction of a 6α-cyano group into the starting compounds and, if desired, the subsequent introduction of the additional double bonds mentioned above.

The aforesaid process can be illustrated by the following reaction diagram, in which R, X and Y have the same meaning as explained hereinbefore, while E is a member of the group consisting of methyl and hydrogen;

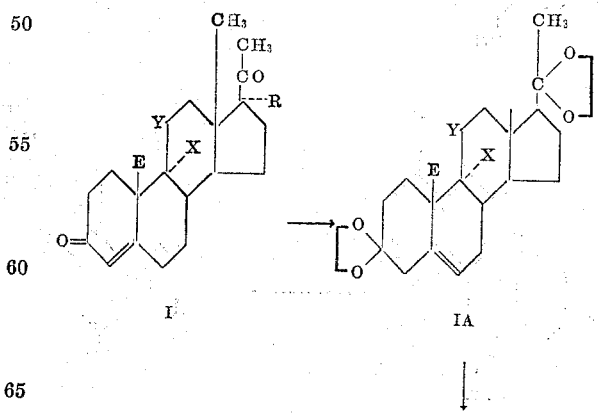

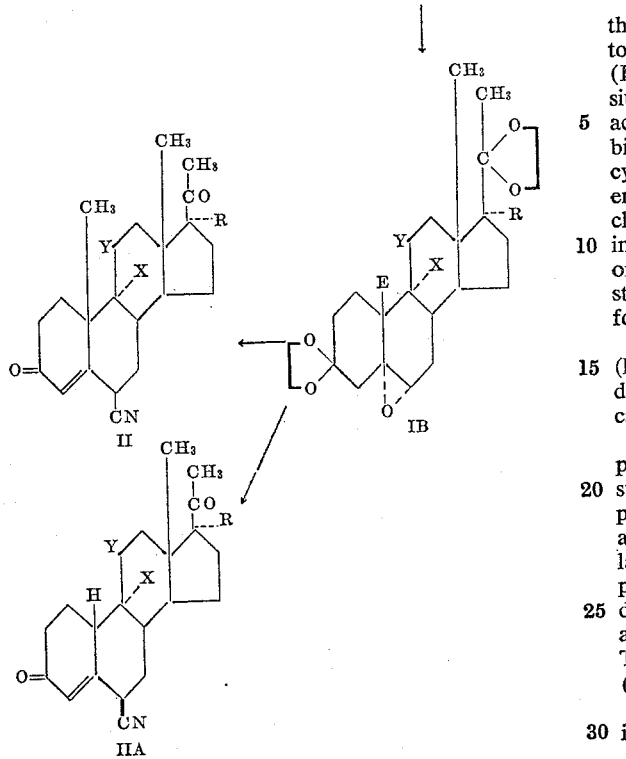

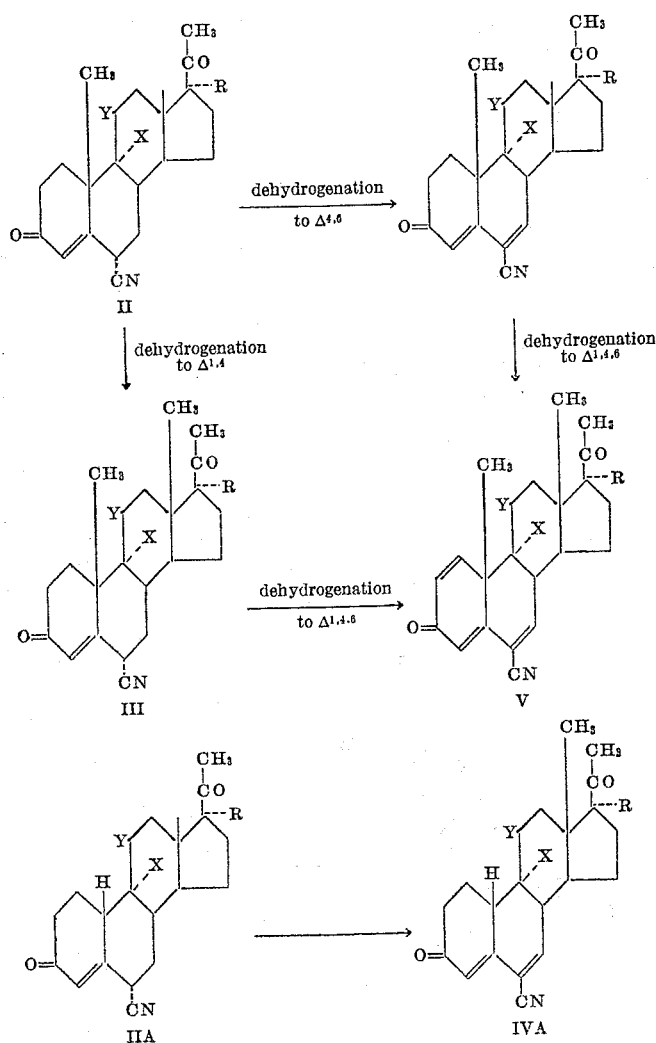

The starting compounds (I) were first converted to their 3,20-bis-ethylenedioxy derivatives (IA) and then to their 3,20-bis-ethylenedioxy-5α,6α-oxido derivatives (IB) and these latter derivatives were refluxed with potassium cyanide in mixture with ethyleneglycol. This reaction afforded a mixture of the respective 6-cyano-3,20-bisethylenedioxy-$\Delta^5$-pregnene and of the corresponding 6-cyano - 3 - hydroxyethoxy-20-ethylenedioxy-$\Delta^{3,5}$-pregnadiene; the mixture was directly treated with dry hydrogen chloride in glacial acetic acid solution thereby producing the 6α-cyano-compounds (II) of the 10-methyl series, or those of the 19-nor series (IIA) depending on the starting material used, in equilibrium with their 3-enol form.

Optionally, we then introduced into the compounds (II) a double bond at C–1 by refluxing with selenium dioxide in mixture with t-butanol and in the presence of catalytic amounts of pyridine (III).

We introduced a double bond at C–6 into either compound II or III, for which purpose a solution of the steroid in t-butanol was, for instance, treated with approximately 1.1 molar equivalents of sodium methoxide, and the resulting 6-cyano-6-sodio compound, without isolation, was treated with 1 molar equivalent of bromine to produce a 6-bromo-6-cyano compound which was then dehydrobrominated by refluxing with γ-collidine or with a mixture of calcium carbonate and dimethylformamide. Thus we produced the 6-cyano-6-dehydro compounds (IV) or the 6-cyano 1,6-bis-dehydro compounds (V).

By a similar method to that described above we also introduced the double bond at C–6 into 6α-cyano-19-norprogesterona and 6α-cyano-19-nor-17α-hydroxyprogesterone (IIA) as well as into their 11-oxygenated derivatives to obtain compounds (IVA).

For esterifying the hydroxyl group at C-17 we employed conventional methods of esterification. In the case of the acetylations with acetic anhydride and acetyl chloride we also isolated 3,17-diacetates of the corresponding intermediate enol.

The reactions described above and more in detail in the examples given hereinafter may be modified within wide limits, both with respect to the reagents and solvents employed as with respect to the conditions of temperature and time. To name some of the possible modifications: the dehydrogenation with selenium dioxide may also be effected in another solvent such as acetic acid, in the presence or in the absence of an adequate catalyst, such as water; instead of t-butanol there may be used another tertiary aliphatic alcohol and/or the pyridine may be substituted by another basic catalyst such as γ-collidine; the refluxing period with selenium dioxide in t-butanol may fluctuate within wide limits, for example between 12 and 96 hours; the dehydrogenation at C-1 may also be achieved by microbiological methods, such as by incubation with Corynebacterium simplex ATCC 6946; instead of sodium methoxide there may be used potassium methoxide and the subsequent bromination may be carried out in another solvent inert to this reaction, for example by substituting the t-butanol by dioxane.

The following examples are intended to illustrate but not to limit the present invention:

Example I

In a conventional manner, for instance by the method described by S. Bernstein et al. in "J. Org. Chem." 17, p. 1341 (1952) we prepared the 3,20-bis-cycloethyleneketal of progesterone.

The epoxidation of the nuclear double bond of this bisketal was carried out as follows: a chloroform solution of the ketal (20 cc. of chloroform for 1 g. of steroid) was cooled to 0° C. and then treated with an ether solution of monoperphthalic acid containing 1.2 molar equivalents of the peracid; the mixture was kept at 0° C. in the dark for 16 hours. After diluting with water the organic layer was separated, washed with water, dried over anhydrous sodium sulfate and the solvent was evaporated under reduced pressure. By chromatography of the residue on neutral alumina there was obtained 3,20-bis-cycloethylenedioxy-5α,6α-oxido-pregnane.

A mixture of 5 g. 3,20-bis-ethylenedioxy-5α,6α-oxido-pregnane (J. Chem. Soc., 4112 (1957)), 10 g. of potassium cyanide and 200 cc. of ethyleneglycol was refluxed for half an hour, poured into ice water and the precipitate formed was collected by filtration, washed with water and dried. The product consisted of a mixture of 6-cyano-3,20-bis-ethylenedioxy-$\Delta^5$-pregnene (M.P. 182–184° C., $[\alpha]_D$ —74°, $\lambda_{max}$ 244mµ, ε=9,590) and of the 3-hydroxyethylether of 6-cyano-20-ethylenedioxy-$\Delta^{3,5}$-pregnadien-3-ol (M.P. 175–177° C., $[\alpha]_D$ —96°, $\lambda_{max}$ 282–284mµ, ε=23,990); a small amount of this mixture was separated into its components by chromatography on neutral alumina.

A slow stream of dry hydrogen chloride was introduced into a solution of the above mixture in 200 cc. of glacial acetic acid, for a period of 3 hours and maintaining the temperature below 18° C.; after pouring into ice water the precipitate was collected, washed with water, dried and recrystallized from acetone, hexane. There was thus obtained 6α-cyano-progesterone.

Example II

A mixture of 3 g. of 6α-cyano-progesterone obtained as described in the preceding example, 100 cc. of t-butanol, 1.2 g. of recently sublimed selenium dioxide and 0.2 cc. of pyridine was refluxed under an atmosphere of nitrogen for 48 hours and then filtered through celite. The solvent was evaporated under reduced pressure, the residue was dissolved in acetone, treated with decolorizing charcoal, refluxed for 2 hours, filtered and the acetone was evaporated. The resulting residue was purified by chromatography on neutral alumina, thus yielding 6α-cyano-1-dehydro-progesterone.

A solution of 2 g. of the latter compound in 60 cc. of t-butanol was added to 1.1 molar equivalents of sodium methoxide prepared by dissolving the corresponding amount of sodium metal in absolute methanol and evaporating the methanol under anhydrous conditions. The mixture was stirred at room temperature for 30 minutes and a solution of 1.1 molar equivalents of bromine in 30 cc. of t-butanol was then slowly added under stirring and while maintaining the temperature below 15° C. The mixture was kept for half an hour at room temperature and diluted with water, and the formed precipitate was collected by filtration, washed with water and dried under vacuum. Crude 6-cyano-6-bromo-1-dehydro-progesterone was obtained. By recrystallization of a small amount of this product from acetone-hexane at low temperature there was obtained the pure 6-cyano-6-bromo-1-dehydro-progesterone.

The above crude compound was dissolved in 20 cc. of dimethylformamide; the solution was added to a suspension of 1.5 g. of calcium carbonate in 30 cc. of dimethylformamide heated to boiling and the mixture was refluxed for 15 minutes, concentrated to about 20 cc. under reduced pressure, cooled and poured into aqueous saturated sodium chloride solution, and the precipitate was collected, washed with water, dried and recrystallized from acetonehexane. There was thus obtained 6-cyano-1,6-bis-dehydro-progesterone.

Example III

In accordance with the method of Example I there were prepared 2 g. of 6α-cyano-progesterone which was then treated with sodium methoxide, bromine and calcium carbonate, as described in Example II. There was thus obtained 6-cyano-6-dehydro-progesterone.

The latter was subjected to a reaction with selenium dioxide, exactly as described in the preceding example, to obtain 6-cyano-1,6-bis-dehydro-progesterone, identical with the compound obtained in accordance with the method described in Example II.

Example IV

A mixture of 3 g. of 6-bromo-6-cyano-progesterone, obtained as an intermediate in the preceding example, and 50 cc. of γ-collidine was refluxed for 1 hour, cooled and diluted with ether, and the collidine hydrobromide was removed by filtration; the filtrate was consecutively washed with dilute hydrochloric acid, 5% aqueous sodium carbonate solution and water, and dried over anhydrous sodium sulfate, and the ether was evaporated; recrystallization of the residue from acetone-hexane yielded 6-cyano-6-dehydro-progesterone, identical with the compound obtained as an intermediate in the method of the preceding example.

Example V

By following the procedures described in the preceding Example I the new compounds listed below were produced from the cited starting materials:

| | Starting Material | Source | New Product |
|---|---|---|---|
| a | 17α-hydroxy-progesterone. | Well known and conventional. | 6α-cyano-17α-hydroxy-progesterone. |
| b | 11-keto-progesterone. | do | 6α-cyano-11-keto-progesterone. |
| c | 11β-hydroxy-progesterone. | do | 6α-cyano-11β-hydroxy-progesterone. |
| d | 11-keto-9α-fluoro-progesterone. | Fried et al., J.A.C.S. 77, p. 1068 (1955). | 6α-cyano-11-keto-9α-fluoro-progesterone |
| e | 11β-hydroxy-9α-fluoro-progesterone. | do | 6α-cyano-11β-hydroxy-9α-fluoro-progesterone. |
| f | 11-keto-9α-fluoro-17α-hydroxy-progesterone. | do | 6α-cyano-11-keto-9α-fluoro-17α-hydroxy-progesterone. |
| g | 19-nor-progesterone. | Well known and conventional. | 6α-cyano-19-nor-progesterone. |
| h | 19-nor-17α-hydroxy-progesterone. | do | 6α-cyano-19-nor-17α-hydroxy-progesterone. |
| i | 11-keto-19-nor-progesterone. | Bowers et al., Tetrahedron, Vol. 2, p. 163 (1958). | 6α-cyano-11-keto-19-nor-progesterone. |
| j | 11β-hydroxy-19-nor-progesterone. | Bowers et al., Tetrahedron, Vol. 2, p. 165 (1958). | 6α-cyano-11β-hydroxy-19-nor-progesterone. |
| k | 9α-fluoro-11β-hydroxy-19-nor-progesterone. | prepared from the known 11α-hydroxy-19-nor-progesterone Pederson et al., J. Am. Chem. Soc., 78, 1512 (1956) by the method described in U. S. Patent 2,852,511. | 6α-cyano-9α-fluoro-11β-hydroxy-19-nor-progesterone. |

*Example VI*

Example I was repeated with 11β,17α-dihydroxy-19-nor-progesterone as the starting material and there was obtained 6α-cyano-11β,17α-dihydroxy-19-nor-progesterone.

The above starting material was prepared from conventional 17α-hydroxy-19-nor-progesterone by the following method:

A culture of *Curvularia lunata* (Syntex strain 192) was prepared by inoculating an aqueous medium containing 2% by weight of peptone and 5% of corn syrup with a vegetative growth of the aforesaid microorganism in the same medium and incubating the culture under stirring at a temperature of 28° C. and under aeration for about 24 hours.

To each liter of this culture there were added 30 cc. of an ethanolic solution of 17α-hydroxy-19-nor-progesterone having a concentration of 10 milligrams of the steroid per cc. The mixture was stirred under aeration at 28° C. for 24 hours. The incubation product was then extracted repeatedly with methylene chloride, the extract was washed with water, dried on sodium sulfate, filtered and the filtration concentrated to a small volume under reduced pressure. A total of 3 g. of 17α-hydroxy-19-nor-progesterone were incubated in this manner. The combined concentrated extracts were then adsorbed on a column charged with 60 g. of silica gel and 60 g. of celite, previously washed with methylene chloride. The charged column was then eluted with a mixture of methylene chloride and acetone in a volume ratio of 4:1; the eluted 11β,17α-dihydroxy-19-nor-progesterone was recovered from the eluate by evaporation of the solvent and the resulting residue was recrystallized from methylene chloride/acetone so as to obtain pure 11β,17α-dihydroxy-19-nor-progesterone ($\Delta^4$-19-nor-pregnene-11β,17α-diol-3,20-dione).

*Example VII*

Example I was repeated with 11-keto-17α-hydroxy-19-nor-progesterone as the starting material, and there was obtained 6α-cyano-11-keto-17α-hydroxy-19-nor-progesterone.

The above starting material was prepared from the starting material of Example VI as follows:

1 g. of 11β,17α-dihydroxy-19-nor-progesterone was dissolved in 20 cc. of acetic acid and treated at 15 to 18° C. with a solution of 240 mg. (1.2 mol equivalents) of chromium trioxide in 10 cc. of 80% acetic acid, the reaction mixture was left standing at room temperature for one hour. Then it was poured into ice water, and the resulting precipitate collected, washed with water until neutral, and recrystallized from methylene chloride/ether, thus yielding 11-keto-17α-hydroxy-19-nor-progesterone.

*Example VIII*

By following the procedure of Examples II to VI, or a similar known dehydrogenation treatment, for instance with chloranil, there were obtained the new $\Delta^{1,4}$, $\Delta^{4,6}$ and $\Delta^{1,4,6}$ derivatives listed below from the new $C^1$ and $C^6$-saturated compounds prepared as cited below:

| $C^1$ and $C^6$ Saturated Compound Obtained According to Example— | New $\Delta^{1,4}$-, $\Delta^{4,6}$- and $\Delta^{1,4,6}$-derivatives |
|---|---|
| a | 5a | 6α-cyano-17α-hydroxy-1-dehydro-progesterone. |
| b | 5a | 6-cyano-17α-hydroxy-6-dehydro-progesterone. |
| c | 5a | 6-cyano-17α-hydroxy-1,6-bis-dehydro-progesterone. |
| d | 5b | 6α-cyano-11-keto-1-dehydro-progesterone. |
| e | 5b | 6-cyano-11-keto-6-dehydro-progesterone. |
| f | 5b | 6-cyano-11-keto-1,6-bis-dehydro-progesterone. |
| g | 5e | 6α-cyano-9α-fluoro-11β-hydroxy-1-dehydro-progesterone. |
| h | 5e | 6-cyano-9α-fluoro-11β-hydroxy-6-dehydro-progesterone. |
| i | 5e | 6-cyano-9α-fluoro-11β-hydroxy-1,6-bis-dehydro-progesterone. |
| j | 5g | 6-cyano-6-dehydro-19-nor-progesterone. |
| k | 5l | 6-cyano-6-dehydro-17α-hydroxy-19-nor-progesterone. |
| l | 6 | 6-cyano-6-dehydro-11β,17α-bis-hydroxy-19-nor-progesterone. |
| m | 7 | 6-cyano-6-dehydro-11-keto-17α-hydroxy-19-nor-progesterone. |

*Example IX*

A mixture of 1 g. of 6α-cyano-17α-hydroxyprogesterone, obtained as described in Example Va, 25 cc. of acetic anhydride and 5 cc. of acetyl chloride was refluxed for 3 hours under an atmosphere of nitrogen and the solvents were removed by distillation under reduced pressure, avoiding overheating. The residue was recrystallized from methanol-chloroform containing a few drops of pyridine. There was thus obtained the diacetate of 6-cyano-$\Delta^{3,5}$-pregnadiene-3,17α-diol-20-one (M.P. 202–203° C., $[\alpha]_D$ —112°, $\lambda_{max}$ 262–264mμ, $\epsilon$=18,620.

500 mg. of the above diacetate was treated with 25 cc. of a 1% methanolic solution of potassium hydroxide and stirred under an atmosphere of nitrogen for 1 hour at 0° C.; the mixture was acidified with acetic acid, concentrated to about 10 cc. and poured into 60 cc. of cold aqueous saturated sodium chloride solution; the precipitate was collected, washed with a little cold water, dried and recrystallized from acetone-hexane. There was thus obtained the acetate of 6α-cyano-17α-hydroxy-progesterone.

*Example X*

By the following the method described in the preceding example there was acetylated the 17α-hydroxyl group of 6-cyano-6-dehydro-17α-hydroxyprogesterone, via the diacetate of 6-cyano-$\Delta^{3,5,7}$-pregnatriene-3,17α-diol-20-one.

*Example XI*

A mixture of 1 g. of 6α-cyano-17α-hydroxy-19-nor-progesterone obtained according to Example Vh, 1 g. of p-toluenesulfonic acid monohydrate, 50 cc. of acetic acid and 10 cc. of acetic anhydride was allowed to react for 3 hours at room temperature. The mixture was then diluted with water, extracted with ether and the extract was consecutively washed with 5% aqueous sodium carbonate solution and with aqueous saturated sodium chloride solution, dried over anhydrous sodium sulfate and the ether was evaporated. Crystallization of the residue from acetone-hexane furnished the acetate of 6α-cyano-17α-hydroxy-19-nor-progesterone.

*Example XII*

A mixture of 1 g. of 6-cyano-6-dehydro-17α-hydroxyprogesterone, obtained according to Example VIII*b*, 50 cc. of benzene, 2 g. of benzoic anhydride and 100 mg. of o-toluenesulfonic acid was kept at room temperature for 48 hours and then diluted with water; the benzene layer was repeatedly washed with water and the solvent was evaporated under reduced pressure. The residue was treated with 50 cc. of 1% methanolic potassium hydroxide solution and the product was isolated as described in Example IX, thus affording the benzoate of 6-cyano-6-dehydro-17α-hydroxyprogesterone.

By dehydrogenation with selenium dioxide, in accordance with the procedure described in Example II, there was obtained 6-cyano-1,6-bis-dehydro-17α-hydroxyprogesterone benzoate.

*Example XIII*

A mixture of 1 g. of 6-cyano-1,6-bis-dehydro-17α-hydroxyprogesterone, obtained according to Example VIII*c*, 50 cc. of benzene, 3 g. of cyclopentylpropionic anhydride and 200 mg. of p-toluenesulfonic acid was allowed to react at room temperature for 72 hours. The product was then isolated in accordance with the method described in the preceding Example, thus yielding 6-cyano-1,6-bis-dehydro-17α-hydroxyprogesterone cyclopentylpropionate.

We claim:
1. A new compound corresponding to a general formula selected from the group consisting of

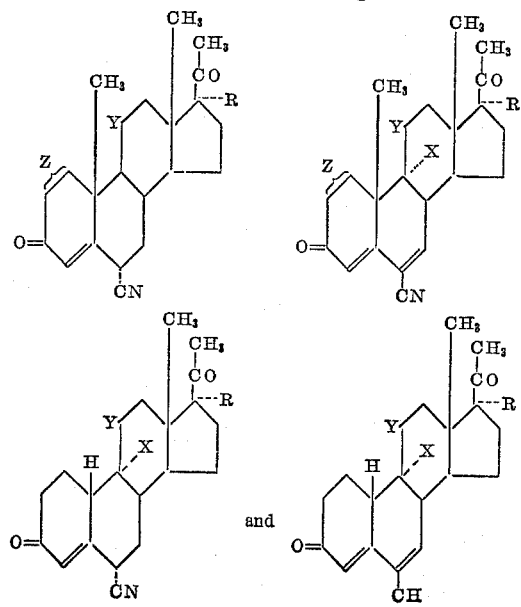

in which formulas R is a member of the group consisting of hydrogen, hydroxy and the acyloxy radical of a hydrocarbon carboxylic acid having up to about 12 carbon atoms; in which Y is selected from the group consisting of

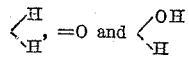

X is a member of the group consisting of hydrogen and fluorine and is hydrogen where Y is hydrogen, and fluorine where

and Z is a member of the group consisting of C—C and C=C.

2. 6α-cyano-progesterone.
3. 6α-cyano-17α-hydroxy-progesterone.
4. 6α-cyano-11-keto-progesterone.
5. 6α-cyano-11β-hydroxyprogesterone.
6. 6α-cyano-19-nor-progesterone.
7. 6α-cyano 19-nor-17α-hydroxy-progresterone.
8. 6α-cyano 19-nor-11-keto-progesterone.
9. 6α-cyano 11α-hydroxy-19-nor-progesterone.
10. 6α-cyano 9α-fluoro-11-keto-progesterone.
11. 6α-cyano 9α-fluoro-11β-hydroxy-progesterone.
12. 6α-cyano-1-dehydro-progesterone.
13. 6-cyano-1,6-bis-dehydro-progesterone.
14. 6-cyano-6-dehydro-progesterone.
15. 6α-cyano-17α-hydroxy-1-dehydro-progesterone.
16. 6-cyano-17α-hydroxy-6-dehydro-progesterone.
17. 6-cyano-17α-hydroxy-1,6-bis-dehydro-progesterone.
18. 6α-cyano-11-keto-1-dehydro-progesterone.
19. 6-cyano-11-keto-6-dehydro-progesterone.
20. 6-cyano-11-keto-1,6-bis-dehydro-progesterone.
21. 6α-cyano-9α-fluoro-11β-hydroxy-1-dehydro-progesterone.
22. 6-cyano-9α-fluoro-11β-hydroxy-6-dehydro - progesterone.
23. 6-cyano - 9α - fluoro-11β-hydroxy-1,6-bis-dehydro-progesterone.
24. 6-cyano-6-dehydro-19-nor-progesterone.
25. 6-cyano-6-dehydro-17α-hydroxy-19-nor - progesterone.
26. 6-cyano-6-dehydro-11β,17α-dihydroxy-19-nor - progesterone.
27. 6-cyano-6-dehydro-11-keto-17α-hydroxy - 19 - nor-progesterone.

References Cited in the file of this patent
Sanchez et al.: "Journal of American Chemical Society" (1959), vol. 81, pp. 5233–5242 relied on.

UNITED STATES PATENT OFFICE
CERTIFICATE OF CORRECTION

Patent No. 3,019,240

January 30, 1962

Albert Bowers et al.

It is hereby certified that error appears in the above numbered patent requiring correction and that the said Letters Patent should read as corrected below.

Column 9, lines 45 to 59, the right-hand formula should appear as shown below instead of as in the patent:

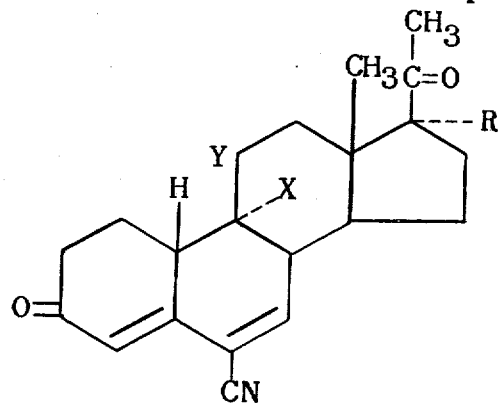

Signed and sealed this 31st day of July 1962.

(SEAL)
Attest:
ERNEST W. SWIDER
Attesting Officer

DAVID L. LADD
Commissioner of Patents